SOUND REPRODUCING DEVICE

Original Filed Sept. 18, 1963 2 Sheets-Sheet 1

INVENTOR:
FRANK M. GRUNWALD,

BY Thomas A. Briody
HIS ATTORNEY.

INVENTOR:
FRANK M. GRUNWALD,

BY Thomas A. Briody
HIS ATTORNEY.

United States Patent Office 3,292,931

Patented Dec. 20, 1966

3,292,931

SOUND REPRODUCING DEVICE

Frank M. Grunwald, Syracuse, N.Y., assignor to General Electric Company, a corporation of New York Continuation of application Ser. No. 309,624, Sept. 18, 1963. This application June 7, 1966, Ser. No. 560,370
2 Claims. (Cl. 274—2)

The present invention is a continuation of my copending application Ser. No. 309,624, filed Sept. 18, 1963, for Improved Sound Reproducing Device, and now abandoned.

This invention relates to an improved audio signal producing device, and more particularly to such devices including cabinets for housing electronic equipment for the reproduction of stereophonic sound.

Present-day one-piece floor, table or portable cabinets such as are in popular use for standard and hi-fidelity sound reproduction equipment, often do not provide the optimum physical arrangement for correctly reproducing stereophonic sound while at the same time providing an effective piece of furniture. For example, it has been found that the prior art coffee-type tables employing such stereophonic equipment, are limited with regard to their utilization as furniture because of the physical arrangement of the one or more components of the equipment in the table structure.

Accordingly, it is an important object of this invention to provide an improved sound producing device that includes a cabinet arrangement which is novel in construction and very flexible in usage.

Another object of this invention is to provide an improved cabinet structure and arrangement for effectively housing stereophonic sound-reproducing equipment while at the same time also efficiently functioning as a decorative piece of useful furniture.

A further object of this invention is to provide a novel device for housing stereophonic sound-reproducing equipment, wherein the turntable of a phonograph, is rotatably supported for selective movement between an exposed and recessed position, and readily operable therebetween.

Still another object of my invention is to provide an improved cabinet for stereophonic equipment which is flexible in application, low in cost, and very economical to manufacture.

In carrying out my invention in one form thereof, I apply it to a cabinet for a sound-reproducing device of the stereophonic type. This device includes a table-type housing that has a horizontally disposed top and at least one vertically disposed side wal. A door is supported within the housing and arranged in this side wall for rotation between first and second positions about an axis perpendicular to the top. A turntable of a phonograph, which is part of the electronic sound-reproducing equipment, is secured to and carried by an inner side of the door. This turntable is exposed from the housing by the door when the door is in a first rotary position and concealed by the door when the door is in a second rotary position. Such an arrangement provides ready access to the turntable of the stereophonic device by simplified rotation of the door about an axis perpendicular to the top wall of the cabinet and also effectively contains the turntable when the phonograph portion of the device is not in use.

Further aspects of my invention will become apparent hereinafter, and the specification concludes with claims particularly pointing out and distinctly claiming the subject matter which I regard as my invention. The invention, however, as to organization and method of operation, together with further objects and advantages thereof, may best be understood by reference to the following description when taken in conjunction with the accompanying drawings, in which:

Figure 1:
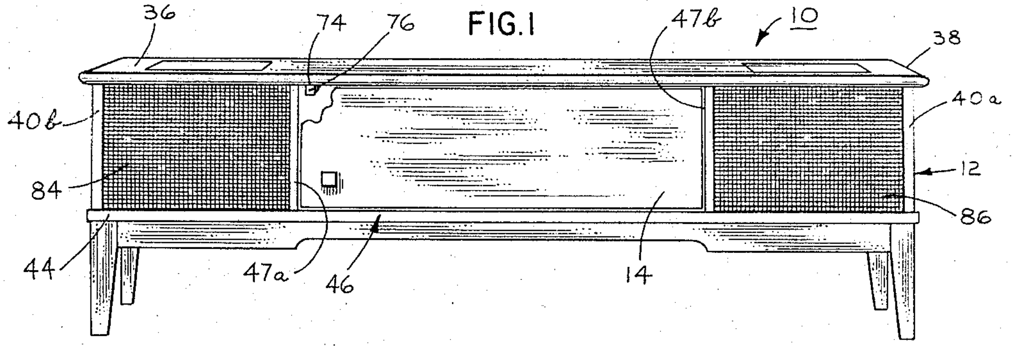
FIG. 1 is a frontal perspective view of an improved sound-reproducing device embodying one form of my invention.
Figure 2:
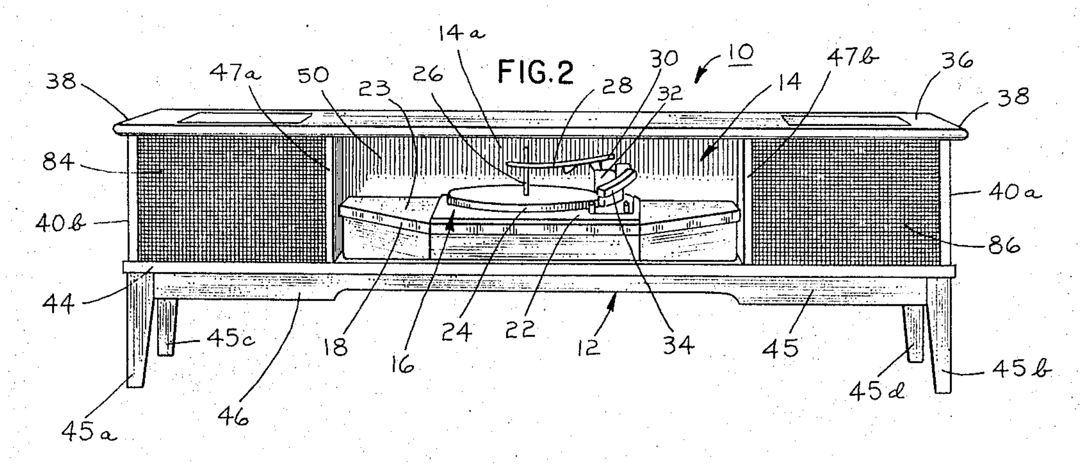
FIG. 2 is a view similar to FIG. 1, showing the turntable of the device in an exposed position.

Referring in detail to the drawings, and in particular to FIGS. 1 and 2, there is shown a phonographic device 10 comprising a housing or cabinet 12, a rotatable door 14 (FIG. 1) which is pivotally supported on the housing 12, and a record player 16 (FIG. 2) mounted to a supporting platform 18 which is secured to the inner side 14*a* of door 14. The record player 16 includes a frame 22 mounted on the upper surface 23 of the supporting platform 18, and a turntable 24 carried upon the frame 22. For centering disc-type records and positioning them in the desired relationship with turntable 24, a spindle 26 is extended upwardly from the turntable 24 in the usual manner.

The record player 16 shown is an automatic record changer type, and employs a record balancing arm 28. The arm 28 is arranged in generally parallel relationship to the turntable 24, and it is carried by attachment of its rear end 30 to a vertical post member 32 (FIG. 2). The balancing arm 28 is arranged on the post member 32 of the record player 16 so that it may be raised and lowered, and is swingable sideways from its raised position for loading records on the spindle 26. More particularly for loading records on the spindle 26, the balancing arm 28 may be raised and swung angularly from a position wherein its free end generally overlies the spindle 26 (FIG. 4) to a position wherein its free end is adjacent to but spaced laterally outwardly from the periphery of a record which is to be loaded. The balancing arm 28 may then be located in a detented position to allow clearance for a record to be loaded upon spindle 26.

A tone arm 34 is located alongside of and above turntable 24, and is provided with a pivotal support near its supported end, in the well-known manner. The arm 34 is pivotally supported so that vertical and horizontal movement is permitted and a pickup stylus or needle (not shown) located at the free end of the arm 34 can engage and reproduce sound signals from the groove of a phonograph record placed in playing position on the turntable 24.

Figures 4, 5:
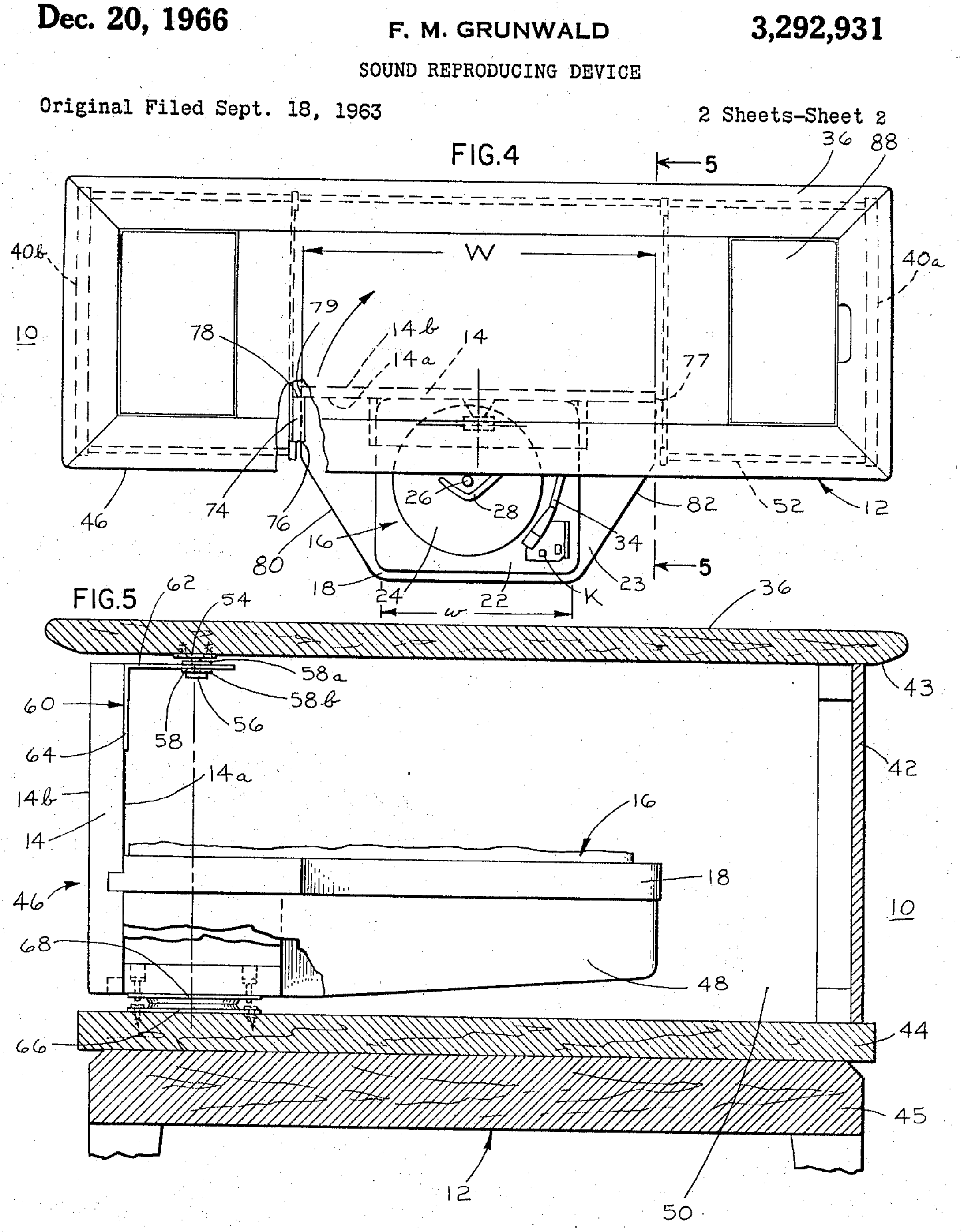
FIG. 4 is a plan view of the sound-reproducing device as shown in FIG. 2.
FIG. 5 is a sectional view taken generally along the line 5—5 of FIG. 4 but showing the turntable in its enclosed position.

Turning now to an important aspect of the present invention, which concerns itself with the arrangement of the record player 16 in the phonograph device 10, attention is directed to FIGS. 1, 2 and 4. For the embodiment shown therein, the housing or cabinet 12 of the improved device 10 is of the table type, has a generally oblong rectangular configuration and includes a substantially horizontal top 36 of elongated configuration. Thus, when the device 10 is positioned on the floor of a room, its height is such that the outer surface of top 36 is located at such a height from the bottom of the device as to provide a readily accessible surface. For example, the device 10 as shown in FIG. 1 may be of such dimensions that the top 36 may effectively provide a coffee-table type of surface upon which household objects of an ornamental and utilitarian nature might be readily placed.

In the illustrative embodiment of the present invention, it is important to note that the elongated top 36 of cabinet 12 has a substantially uninterrupted outer surface. In the event that it is desired to use the device 10 as a table, such a structural arrangement is distinctly advantageous in order to minimize the possibility of inadvertent liquid spillage entering into the interior of the housing, and to provide a substantial and readily available overall surface for the placement of household objects thereon. The outer periphery of the top 36 of the housing 12 is preferably beveled, as shown in FIGS. 1, 2 and 5 to eliminate the possibility of rough edges and enhance its attractive appearance.

To help support the elongated top 36 of cabinet 12 and form surrounding walls for cabinet 12, opposed solid end walls 40*a* (FIG. 3) and 40*b* (FIG. 1), and rear upright wall 42 (FIG. 5) have been provided. The end walls 40*a*, 40*b* are arranged in upright fashion on the cabinet and are suitably secured at their upper ends to the bottom surfaces of top 36 near shorter ends 38 thereof (FIG. 2). The rear upright wall 42 is suitably secured at its upper end to the bottom surface of top 36 near its longer and rearward end 43 (FIG. 5).

The lower ends of the solid end walls 40*a*, 40*b* and rear upright wall 42 are suitably secured to and supported by a cross brace of bottom deck 44. The deck 43 is in turn supported by an oblong rectangular platform 45 having upright legs 45*a*, 45*b*, 45*c* and 45*d* (FIG. 2) connected to its corners for engagement with a floor upon which the device 10 is to be positioned.

On the front elongated side 46 (FIG. 1) of the phonographic device 10 there is centrally located the aforementioned pivotally-mounted door 14. As shown in FIG. 1, when door 14 is closed it is arranged in generally flush fashion with and forms part of the elongated frontal side 46, which includes the outwardly facing surfaces of door frame uprights 47*a*, 47*b*, the ends 40*a* and 40*b* of housing 12, and bottom deck 44. As shown in FIG. 5, on the inner surface 14*a* of the door 14 there is secured the record player supporting platform 18 and a bucket-like support 48 which depends from platform 18. The platform 18 and support 48, in combination with door 14 form a generally L-shaped unit which is rotatably supported in the housing 12, as shall become apparent hereinafter.

Figure 3:
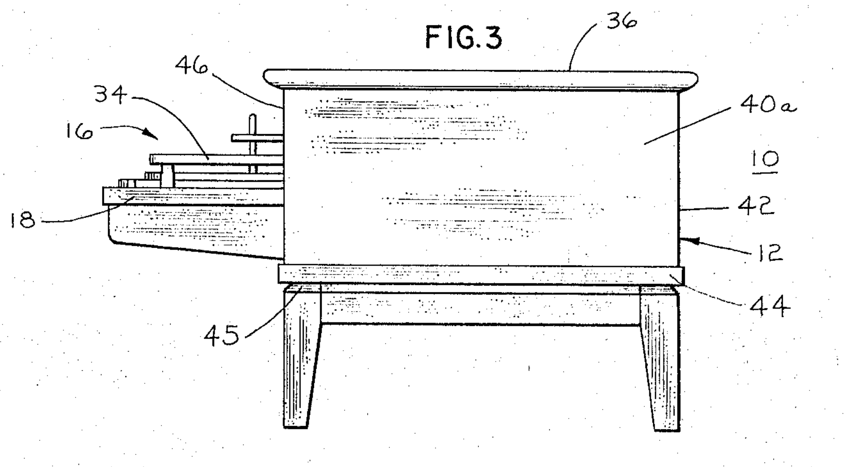
FIG. 3 is a right end view of the sound-reproducing device as it is shown in FIG. 2.

To receive and contain the record player 16 and its supporting means within cabinet 12, I have provided the rectangular recess 50. Recess 50 is centrally arranged between ends 40*a* and 40*b* of housing 12 (FIG. 2) and it opens into the frontal elongated side 46 of housing 12. More particularly, as shown in FIG. 2, recess 50 has a box-shaped configuration, and is formed by transverse vertical walls 47*a* and 47*b* which are disposed in perpendicular relationship respectively, with the bottom surface of top 36, the upper surface of bottom deck 44, and the inner surface of rear side 42 (FIG. 3).

On the bottom surface of cabinet top 36 (as shown in FIG. 5) near the frontal side 46 of recess 50, and centrally located between end walls 40*a*, 40*b* (FIG. 2) there is mounted a plate 54 with a depending headed stud 56 secured thereto. The stud 56 has its shank extended downwardly from plate 54 through a bearing bushing 58 which is located in an aperture of an L-shaped bracket 60. The bushing 58 may be secured to arm 62 of bracket 60 by means of annular flanges 58*a*, 58*b* of the bushing 58 which are located on opposite sides of arm 62. To enable the bushing 58 to freely rotate upon the stud 56 with minimal abrasion, it is preferable that the bushing be constructed of a suitable bearing material, such as nylon.

As shown in FIG. 5, the arm 62 of bracket 60 is thus arranged in generally parallel relationship to top 36 of housing 12, and bracket 60 is rotatably supported upon the depending stud 56 by means of the extension of the stud through bearing bushing 58. The head of stud 56 serves to limit downward movement of bracket 60 with respect thereto by engagement with one of the annular flanges 58*b* of the bushing 58.

The other arm 64 of the L-shaped bracket 60 is secured to the inner side 14*a* of door 14 near the top thereof (as shown in FIG. 5) to provide a first rotatable bearing for the door 14 and its associated bucket 48.

On the top surface of bottom deck 44 of the housing 12 (as shown in FIG. 5), near the frontal side 46, there is secured a bottom bearing plate 66. Bearing plate 66 is arranged to cooperatively engage an overlying bearing plate 68 which is suitably secured to the bottom surface of bucket 48 near door 14. The bearing plate 68 is rotatably guided upon and cooperatively engages plate 66 to provide a second and lower rotatable bearing means and support for the door 14 and its associated bucket 48.

The axes of the first bearing means 56, 58 and the second bearing means 66, 68 are disposed in alignment and located as illustrated in FIGS. 4 and 5, midway between the ends 40*a*, 40*b* of the housing, and spaced rearwardly a short distance from frontal side 46. With such an arrangement, as shown in FIG. 4, when the door 14 is in its open or unrecessed position, a substantial portion of the turntable 24 on the turntable supporting platform 18 projects outwardly and is exposed from recess 50 (see also FIG. 2). The turntable is thereupon readily accessible for the positioning and removal of records, and the control knobs K associated with the turntable 24 may thereupon be readily manipulated to operate the phonographic device 10. After one or more records have been placed upon the spindle 26 of turntable 16, one of the control knobs K may be actuated to commence a record playing cycle.

The door 14 and its rigidly associated bucket 48 may then be readily pushed so that it rotates from its FIG. 4 position, in the direction indicated by the arrow in FIG. 4, until the front face 14*b* of door 14 faces outwardly (as shown in FIG. 5). The record player 16 is then completely enclosed in housing 12 by closure of door 14 (FIG. 1) and the records will be played by the automatic record changer mechanism until each record has had its upwardly facing side reproduced. It will be further understood that when the phonograph record player 16 is not in use, it would normally be retained in its recessed position (FIGS. 1 and 5), where it is protected and safeguarded from any possible damage.

To provide simplified and effective operating limits for the rotation of the door 14 and its associated record player 16, as shown in FIGS. 1 and 4, an elongated member 74 of rectangular cross-section is located in transversely extensive fashion in recess 50 near the upper left of the frontal opening of recess 50 (viewing FIG. 1). The front face 76 of member 74 (FIG. 1) is engaged by the inner surface 14*a* of door 14 near side 77 of the door (FIG. 4) to limit rotative movement of door 14 from its open position (FIG. 4) to its closed position (FIG. 1). The rear face 78 of member 74 is engaged by the inner surface 14*a* of door 14 near the other side 79 thereof (FIG. 4) to limit rotative movement of door 14 from its closed position (FIG. 1) to its open position (FIG. 4).

To help provide maximum space utilization in accommodating the limited rotation of record player 16 and its door 14 and to also furnish a sturdy support for player 16, the platform 18 and bucket 48 have an internal width W (viewing FIG. 4) which is considerably larger than the external width *w* (i.e. near the tone arm of the record player, viewing FIG. 4), and the sides of the platform 18 and bucket 48 are tapered at 80 and 82.

It will thus be understood that the door 14, platform 18, bucket 48, and the record player 16 are rotatably operable in simplified fashion through an angle of 180 degrees to expose or conceal the turntable of the record player and its accessories. It will also be realized that in accordance with the present invention, the top 36 of the housing 12 is beneficially uninterrupted by any access door to the record player, because the door 14 is located on the frontal side 46 of the housing. In addition, since the axis of rotation for door 14 is perpendicular to top 36 of the housing and located in recess 50 as shown in FIG. 4, an economical utilization of cabinet space is effectively achieved. More particularly, for example, as shown in FIGS. 1 and 2, a relatively small dimension is required between top 36 and deck 44 of cabinet housing 12 for accommodating the turntable 16 and its accessories.

As shown in FIGS. 1 and 2 the cabinet 12 of device 10 includes left and right speaker enclosures 84 and 86, respectively. Each of the speaker enclosures 84 and 86 may accommodate one or more speakers which are connected to the output of one channel of a dual channel audio amplifier (not shown). It will be understood that this amplifier may be effectively located within housing 12, along with other appropriate electronic components to provide stereophonic reproduction of sound through the speaker enclosures 84 and 86.

As further shown in FIG. 4, a relatively small pivoted door 88 may be provided in top 36 to provide access to appropriate controls (not shown) of the dual channel audio amplifier.

It will now, therefore, be understood that in accordance with the present invention I have provided an improved cabinet arrangement for effectively housing stereophonic sound reproducing equipment. It will also be realized that my improved sound reproducing device includes a structural arrangement which is flexible in application and economical to manufacture.

While in accordance with the Patent Statutes, I have described what at present is considered to be the preferred embodiment of my invention, it will be obvious to those skilled in the art that various changes and modifications may be made therein without departing from my invention, and I therefore aim in the following claims to cover all such equivalent variations as fall within the true spirit and scope of this invention.

I claim:

1. A stereophonic sound reproducing device comprising a rectangularly configured coffee table-type housing having a horizontally disposed top connected to vertically arranged front and back walls and to vertically arranged end walls, said top having a substantially uninterrupted outer surface for enabling it to serve as a table surface, a rectangularly configured recess located in said housing underneath said top in central disposition between said end walls and opening into said front wall, a left speaker enclosure located in said housing on one side of said recess between said recess and one of said end walls, a right speaker enclosure located in said housing on the other side of said recess between said recess and the other of said end walls, a substantially L-shaped support including first and second legs, an automatic record player including a turntable supported upon and carried by the first leg of said support, a record receiving spindle for sequencing and positioning a plurality of records on said turntable, and bearing means disposed underneath said top for rotatably mounting said support in said housing for movement about an axis disposed perpendicular to and underneath said top, said axis being perpendicular to said first leg of said support, means for limiting rotatable movement of said support between first and second positions spaced 180 degrees apart, said means including a single member arranged to contact said second leg during movements of said support both from its first position to its second position and from its second position to its first position, the second leg of said support being arranged for rotatable oscillation about said axis so that it closes said recess and forms part of said front wall when said support is in said first position, said record player being arranged on said first leg so that a substantial portion of said turntable including said spindle extends outwardly from said recess to afford ready access to said player when said support is in the second position, said automatic record player being further arranged to play a plurality of records, when said support is in either said first or second position.

2. A stereophonic sound reproducing device comprising a rectangularly configured coffee table-type housing having a horizontally disposed top connected to vertically arranged front and back walls and to vertically arranged end walls, said top being disposed at a relatively low height thereby to enable a person reposing on a chair adjacent said device to have ready access to said top, said top having a substantially smooth and uninterrupted upwardly facing surface for enabling it to serve as a table surface, a rectangularly configured recess located in said housing underneath said top in central disposition between said end walls and opening into said front wall, a left speaker enclosure located in said housing on one side of said recess between said recess and one of said end walls, a right speaker enclosure located in said housing on the other side of said recess between said recess and the other of said end walls, said speaker enclosure opening into said front wall on left and right respective sides of said recess, a substantially L-shaped support including first and second legs, said first leg being disposed in horizontal disposition in said device and said second leg being disposed in vertical disposition in said device, an automatic record player including a turntable supported upon and carried by the first leg of said support, a record receiving spindle for sequencing and positioning a plurality of records on said turntable, and bearing means disposed in said housing underneath said top and beneath the upwardly facing surface of said top for rotatably mounting said support in said housing for movement about an axis disposed perpendicular to and underneath said top, said axis being perpendicular to said first leg of said support, means for limiting rotatable movement of said support between first and second positions spaced 180 degrees apart, said means including a single member arranged to contact said second leg during movements of said support both from its first position to its second position and from its second position to its first position, the second leg of said support being arranged for rotatable oscillation about said axis so that it closes said recess and forms part of said front wall when said support is in said first position, said record player being arranged on said first leg so that a substantial portion of said turntable including said spindle extends outwardly from said recess to afford ready access to said player when said support is in the second position, said automatic record player being further structurally arranged in said device to play a plurality of records when said support is in either said first or second position.

References Cited by the Examiner

UNITED STATES PATENTS 3,090,462 5/1963 Huff et al. ---------- 181—31

FOREIGN PATENTS 604,671 10/1934 Germany.
812,271 8/1951 Germany.

NORTON ANSHER, *Primary Examiner.*

C. B. PRICE, *Assistant Examiner.*